Jan. 10, 1967     K. E. HUMBERT, JR     3,297,160
FILTER APPARATUS
Filed Dec. 31, 1963
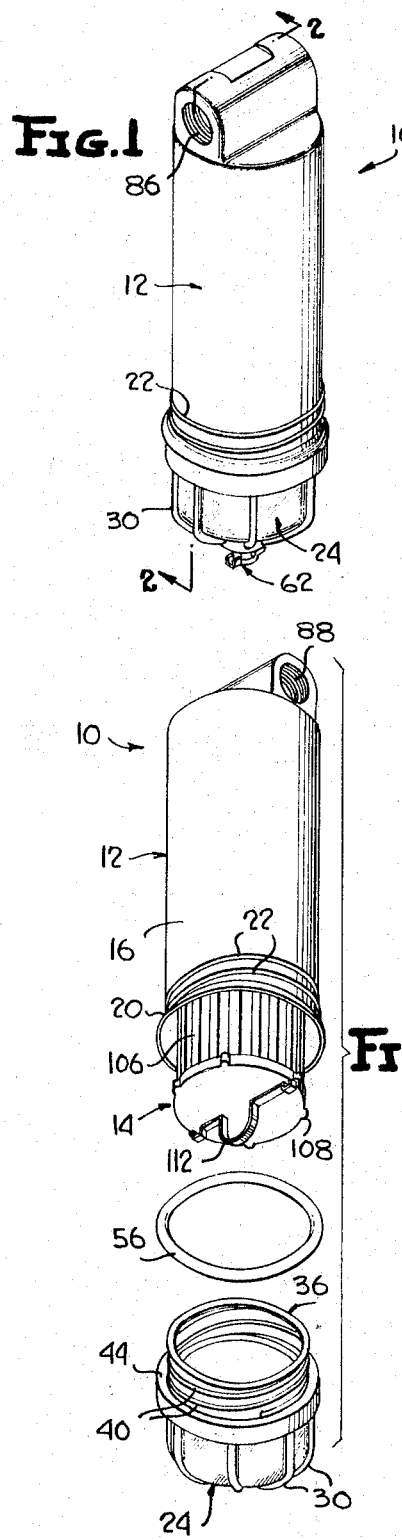
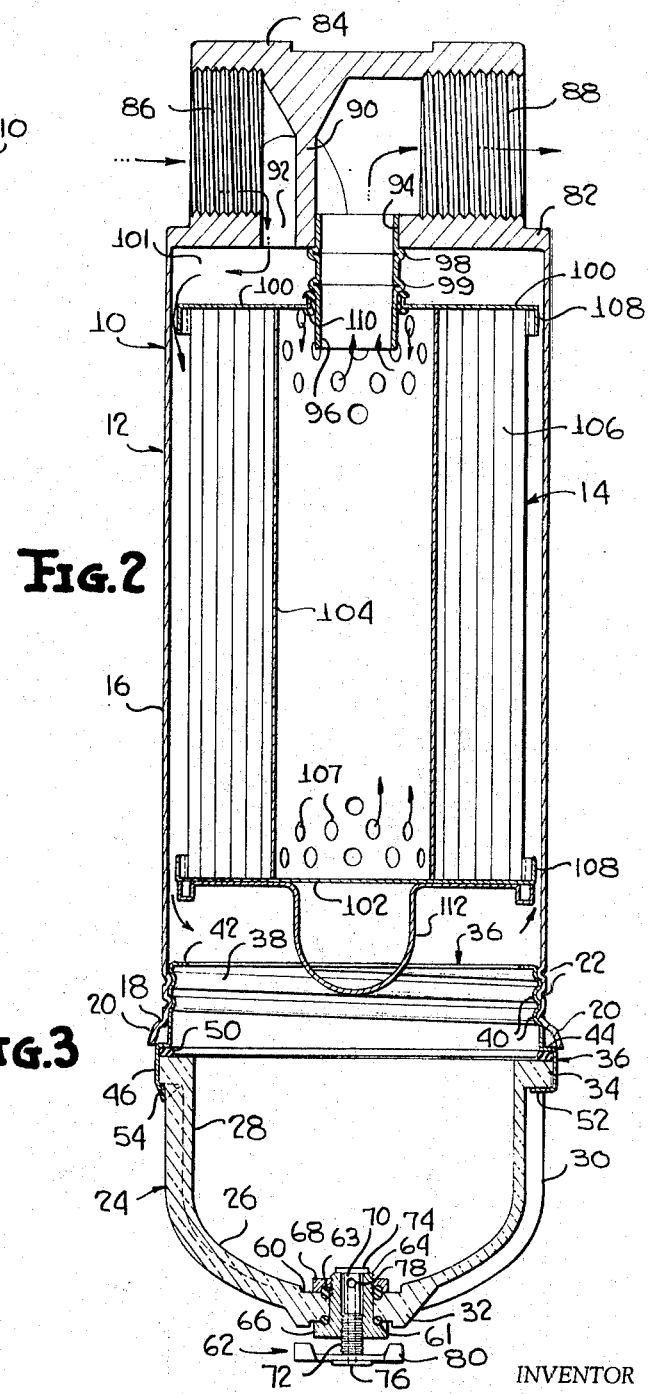
INVENTOR
KINGSLEY E. HUMBERT, Jr.
BY *Shoemaker and Mattare*
ATTORNEYS

3,297,160
FILTER APPARATUS
Kingsley E. Humbert, Jr., Gastonia, N.C., assignor to Wix Corporation, Gastonia, N.C., a corporation of North Carolina
Filed Dec. 31, 1963, Ser. No. 334,878
12 Claims. (Cl. 210—94)

This invention relates to a new and novel filter apparatus, and more particularly to filter apparatus which is particularly adapted to be used with gasoline pumps and so designed that the gasoline flowing through the filter apparatus may be seen through a transparent wall portion.

The filter apparatus of this invention is of the type employing a removable cartridge which is adapted to be replaced from time to time. It is a particular object of the invention to provide a filter apparatus having a casing or container which includes a transparent wall portion so that a person can readily view the interior of the filter apparatus and observe the gasoline passing therethrough when the device is used for dispensing gasoline from a gasoline pump.

This invention is an improvement over my copending application Serial No. 263,203, filed March 6, 1963, now Patent No. 3,237,770; issued March 1, 1966.

Briefly, the invention comprises a filter apparatus which includes a hollow casing or container including a metal portion enclosing a filter cartridge, a transparent bowl composed of glass connected by novel means to one end of the metal portion and inlet and outlet passage means provided in the other end of the metal portion. The gasoline flowing through the filter apparatus may be visually observed through the glass bowl, and dirt, water and other foreign substances which may collect in the glass bowl may also be readily observed. The glass bowl is also provided with drainage means whereby water and other contaminants may be drained therefrom when desired. It is desirable to have the transparent bowl composed of glass rather than plastics because glass is not adversely affected by aromatics which are present in high octane gasolines. From previous experience, it has been found that certain plastics are adversely affected by the aromatics in high octane gasoline. Although glass is a desirable substance for constructing the viewing bowl, conventional means for connecting the glass bowl to the metal container of the filter apparatus was found to be unsatisfactory. Since it is highly desirable that the glass bowl be connected to the end of the metal portion of the filter container so that the bowl may be easily connected and disconnected from the metal container so as to permit replacement of the filter cartridge and cleaning of the glass bowl, initial attempts were made to connect the glass bowl to the metal portion of the container by thread means. However, this type of connection proved to be unsatisfactory because the tremendous fluid pressures within the filter apparatus caused the threads on the glass bowl to become fractured. Although various types of thread forms and thicknesses were tried on the glass bowl for connecting it to the metal portion of the container, none proved satisfactory.

A threaded metal neck was then sealingly secured in a novel manner to the glass bowl and this metal neck was in turn threaded into an open end of the metal portion of the filter container. This means of connecting the glass bowl to the metal portion of the container withstood all pressures encountered in use and proved to be completely satisfactory. Accordingly, it is an important object of this invention to provide novel means for connecting a transparent bowl to a metal portion of a filter container.

Another object of the invention is to provide a filter apparatus which employs a minimum of parts, is economical to manufacture, is durable in use, which eliminates the necessity of providing a long screw through the filter cartridge of the apparatus which ordinarily must be used with conventional filter apparatus, and is so designed that the filter cartridge requires only one seal thereby making it more economical to manufacture and reliable in use.

Still another object of the invention is to provide a filter apparatus which incorporates means to afford visibility to the interior such that one can readily observe the gasoline flowing through the filter apparatus.

It is still another object of the invention to provide a filter apparatus which may be readily disassembled and reassembled, and is provided with novel means for draining the filter apparatus.

The invention will be best understood from a consideration of the following detailed description taken in connection with the accompanying drawings wherein:

FIGURE 1 is a perspective view of the invention;
FIGURE 2 is an enlarged vertical cross sectional view taken on the plane of line 2—2 of FIGURE 1; and
FIGURE 3 is an exploded perspective view of the invention.

As illustrated in the drawings, wherein like reference numerals throughout the various views indicate the same parts, the filter apparatus 10 includes a hollow casing or container 12 having a filter cartridge 14 therein.

The container 12 includes a cylindrical upper portion 16 having a lower end formed with a substantially radially extending annular flange 18 which has an outer edge integrally connected to a frusto-conical lip 20. A spiral thread 22 is formed in the lower end of portion 16 directly above flange 18.

The container 12 also includes a transparent bowl 24 preferably composed of glass and being substantially U-shaped in cross section. The bowl includes a semispherical or dome shaped bottom wall 26 integrally connected to an upper cylindrical wall 28. The walls are reinforced by a plurality of integral and substantially U-shaped ribs 30 which are circumferentially spaced from one another, extend axially of the bowl and intersect or merge with an annular flange 32 formed on the bottom of the bowl. The upper ends of the ribs 30 extend to and merge with a radially projecting annular flange 34, formed integrally with the bowl.

The bowl 24, is removably connected to the upper portion 16 by a metal neck 36 which is permanently secured to the bowl. The neck 36 includes a tubular body portion 38 formed with threads 40 which mate with the threads 22. The upper end of the neck 36 is formed with a radially inwardly projecting flange 42 and the lower end of the body portion 38 is formed with a radially outwardly projecting annular flange 44. The outer edge of the flange 44 is integrally formed with a downwardly projecting connecting ring 46 which snugly receives the outer peripheral surface of the radial flange 34. An annular sealing gasket 50 is compressed between radial flanges 34 and 44 so as to provide an effective seal between bowl 24 and neck 36. The bottom edge of ring 46 is crimped under radial flange 34 so as to form a lip 52 which secures the bowl and neck together, prevents rotation between the bowl and neck, and maintains seal 50 in a compressed condition. Since the ribs 30 are each of semicircular shape in transverse cross section, the lip 52 must be flared outwardly where it crosses the ribs as illustrated at 54 in FIGURE 2.

An annular sealing gasket 56 normally surrounds the tubular body portion 38 and when the neck 36 is screwed into portion 16, gasket 56 is compressed between radial flanges 18 and 44 so as to provide an effective seal between the neck and portion 16. For purposes of clarity, gasket 56 has been omitted from FIGURE 2.

The bottom of bowl 24 is provided with a flat circular portion 60 to which is connected a drain valve 62. The valve 62 includes a tubular body 64 extending through a bore in the center of circular portion 60 and having an annular flange 66 abutting the bottom of portion 60. A nut 68 is threaded on the upper end of body 64 whereby body portion 60 is clamped between flange 66 and the nut so as to removably secure the valve 62 to cup 24. Preferably, an annular flexible sealing washer 63 is compressed between nut 68 and portion 60, and a similar washer 61 is compressed between flange 66 and portion 60.

A valve stem extends through body 64 and is rotatably connected thereto by threads 72 which mate with threads inside body 64. Stem 70 is provided with a valve member 74 on its upper end and an axial passage 76 extending from the bottom thereof and terminating in a radial port 78. An operating handle 80 is fixed to the lower end of stem 70. As shown in FIGURE 2, valve 62 is closed since valve member 74 seats on the upper end of body 64. To open the valve, it is only necessary to rotate handle 80 so that stem 70 is threaded upwardly so as to unseat valve member 74 from the upper end of body 64.

The upper end of the casing 12 is closed by a circular wall 82 integrally formed with the cylindrical upper portion 16. A projection 84 which is a substantial U-shape in cross section is integrally formed with the wall 82. The projection 84 has an inlet passage 86 formed in one of its ends and an outlet passage 88 formed in its other end. Both of the passages 86 and 88 are internally threaded and are separated from one another by a wall portion 90. The inlet passage 86 communicates with the interior of container 12 by a passage 92. A bore 94 is formed through the center of wall 82 and a sleeve 96 is press fitted within this bore. Sleeve 96 has formed in a central portion thereof two axially spaced annular corrugations or ribs 98 and 99 which project radially outwardly. Rib 98 abuts the lower surface of wall 82 and thereby limits the extension of sleeve 96 into bore 94.

The filter cartridge 14 comprises a circular upper end wall 100 and a circular lower end wall 102 rigidly connected together by a central tube 104 which is provided with a plurality of perforations 107 which are located throughout its length and periphery. A filter element 106 surrounds tube 104 and is interposed between the end walls 100 and 102. Filter element 106 may comprise a conventional pleated paper filter element which may be treated with silicone or a similar substance so as to be water repellant. End walls 100 and 102 are provided with lips 108 which overlap the filter element 106 and are respectively adhesively bonded to the ends of filter element 106 so as to retain it in position. The upper wall 100 is provided with a central bore, and the edges defining this bore project into an annular peripheral slot formed in a sealing gasket 110. Sealing gasket 110 is thus compressed between the outer surface of sleeve 96 and the edges defining the bore through wall 100 so as to provide an effective seal between the interior of tube 104 and the exterior of filter element 106. Sealing gasket 110 abuts the lower surface of rib 99 whereby the rib functions as a stop for cartridge 14 so that a space 101 will be provided between walls 82 and 100.

A U-shaped handle 112 composed of a strip of sheet metal is welded to the bottom surface of wall 102. Elements 100, 102, 104 and 112 of the filter cartridge are all composed of metal.

The container portion 16, the wall 82 and the projection 84 are preferably formed of aluminum integrally cured together. The neck 36, sleeve 96 and sleeve extension 98 are also preferably formed of a suitable metal impervious to gasoline. The bowl 24 is preferably composed of tempered Pyrex glass.

As illustrated in FIGURE 3, to assemble the filter apparatus 10, the filter cartridge 14 is inserted into the lower end of container portion 16 so that sleeve 96 extends through gasket 110 so as to compress it between the sleeve and the inner edges of wall 100. The compression of the gasket 110 frictionally retains the filter cartridge in position. To remove the filter cartridge 14, it is only necessary to unscrew bowl 24 and neck 36 from container portion 16 and pull the cartridge 14 out of the container portion 16.

In use, the inlet passage 86 is connected to a gasoline pump and the outlet passage 88 is connected to a dispensing nozzle. The gasoline flows inwardly through passage 86, passage 92, around wall 100 and some of the gas flows through filter element 106 into tube 104. The gas then flows upwardly through sleeve 96, passage 88 and then outwardly through the dispensing nozzle. The filter element 106 effectively prevents dirt and other foreign particles from passing through passage 88 and the dispensing nozzle. Some dirt, rust and other foreign particles fall downwardly and collect within the bowl 24. Also, any water in the gasoline due to its higher specific gravity also settles in the bowl 24. Thus, not only can the gasoline be observed, through the bowl 24, that is flowing through the filter, but also, dirt, rust particles and water which collects in the bowl 24 can be easily observed whereby one purchasing gasoline may readily view the foreign substances and impurities which are removed by the filter from the gasoline. Water collecting within the bowl 24 may be easily drained therefrom by opening valve 62. Dirt, rust and other solid particles collecting within the bowl may be easily removed therefrom by unscrewing the bowl from the container portion 16 and then cleaning the bowl. When the bowl is removed, sealing gasket 110 will frictionally retain the filter element within the container portion 16. It is also to be noted that when the filter apparatus 10 is in use, fluid pressure acting on the bottom of the lower wall 102 will tend to force the filter cartridge upwardly and compress the sealing gasket 110 in sealing relationship against the wall 82.

The filter apparatus of this invention will withstand the pressures normally existing in fuel dispensing systems such as gasoline pumps, gravity tanks and the like, and also has been successfully used in connection with low and intermediate pressure stages of fuel systems for diesel engines. The neck 36 connects the glass bowl 24 to the container portion 16 so that the glass bowl can withstand the relatively high pressures within the filter apparatus without failure.

Inasmuch as various changes may be made in the form location and relative arrangements of the several parts without departing from the essential characteristics of the invention, it will be understood that the invention is not to be limited except by the scope of the appended claims.

What is claimed is:

1. A filter apparatus comprising a container having opposite ends, one of said ends provided with inlet and outlet passage means, a glass bowl closing the other end of said container, the glass bowl having an open end and including an annular flange integrally secured to said open end, said flange projecting radially from said bowl, a metal sleeve comprising an annular body having threads on one end thereof, a radial flange on the other end of said annular body, a ring secured to said radial flange and crimped over said annular flange of the bowl, a sealing gasket compressed between the radial flange and the annular flange, a filtering means within the container, the other end of said container having threads thereon mating with the threads of the annular body to releasably secure the glass bowl and sleeve to the other end of the container.

2. Apparatus as defined in claim 1, including an end flange connected to and projecting radially outwardly from said other end of said container, a second sealing gasket compressed between said end flange and said radial flange.

3. Filter apparatus as defined in claim 1, including spaced reinforcing ribs integrally formed with said bowl and extending around the exterior surface thereof, the ends of said ribs, being connected to said annular flange.

4. Filter apparatus as defined in claim 1, including a drain valve connected to and extending through a bottom wall of said bowl whereby said bowl may be selectively drained.

5. An end closure of a filter container comprising a glass bowl having an open end, an annular flange integrally secured to said open end and projecting radially outwardly therefrom, a metal neck secured to said open end and comprising an extension of said bowl, said neck including an annular body provided with threads on one of its ends, the other end of said body connected to a radial flange adjacent said annular flange, a ring secured to said radial flange and telescopically receiving said annular flange, said ring having a free end portion bent around a corner of said annular flange so as to provide a lip substantially parallel to said radial flange, and a sealing gasket compressed between said radial and annular flanges.

6. An end closure as defined in claim 5, wherein said bowl includes integral glass reinforcing ribs formed on the exterior surface thereof and a drain valve extending through a portion thereof.

7. A filter apparatus comprising a hollow casing having upper and lower ends, a casing wall closing said upper end, a separate sleeve inserted into an outlet opening formed in said upper end casing wall, and projecting into said casing, the sleeve having a first means thereon limiting the insertion into the outlet opening, an annular filter cartridge within said casing, said filter cartridge comprising a tubular filter element disposed between liquid impervious end walls, one of said end walls having a bore receiving said sleeve therethrough, the sleeve having a second means thereon limiting the movement of the filter cartridge on the sleeve, a resilient seal compressed between said sleeve, second means and the edges defining said bore whereby said filter cartridge is frictionally secured to said sleeve, said casing wall being provided with an inlet passage formed in said casing wall, a transparent wall closing said lower end of said casing, and connecting means releasably connecting said transparent wall to said casing.

8. A filter apparatus as defined in claim 7, wherein said connecting means comprises a metal sleeve having one of its ends connected by thread means to said lower end and another of its ends clamped around an edge of said transparent wall.

9. A filter apparatus as defined in claim 8, wherein said transparent wall comprises a tempered Pyrex glass bowl.

10. A filter apparatus as set forth in claim 7, wherein the first means on the sleeve comprises an annular rib projecting radially outwardly from said sleeve and engaging the casing wall to limit the insertion of the sleeve into said casing wall.

11. A filter apparatus as described in claim 7, wherein the second means on the sleeve comprises an annular rib projecting radially outwardly from said sleeve and which is engaged by the resilient seal to limit the movement of the filter cartridge on the sleeve and which aids in compressing the seal to prevent leakage therearound.

12. An end closure of a filter container comprising a glass bowl having an open end, integral means on the open end and projecting outwardly therefrom, a separate neck fixedly secured to the open end and comprising an extension of the bowl, the neck having a body portion provided with connecting means thereon, the neck having a second body portion thereon including means for fixedly interconnecting with the integral means on the open end of the bowl and sealing means in the interconnection.

References Cited by the Examiner
UNITED STATES PATENTS

| | | | |
|---|---|---|---|
| 2,200,795 | 5/1940 | Krieck | 210—94 |
| 2,720,278 | 10/1955 | Wiley | 210—444 X |
| 2,804,211 | 8/1957 | Kennedy | 210—444 X |
| 3,237,769 | 3/1966 | Humbert | 210—94 |

REUBEN FRIEDMAN, *Primary Examiner.*

SAMIH N. ZAHARNA, *Examiner.*